(12) United States Patent
Chandhoke (10) Patent No.: US 8,295,287 B2
(45) Date of Patent: Oct. 23, 2012

(54) NETWORK TRAFFIC SHAPING FOR REDUCING BUS JITTER ON A REAL TIME CONTROLLER

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 368 days.

(21) Appl. No.: 12/694,348

(22) Filed: Jan. 27, 2010

(65) Prior Publication Data

US 2011/0182300 A1   Jul. 28, 2011

(51) Int. Cl.
   *H04L 12/56* (2006.01)
(52) U.S. Cl. ............ 370/395.4; 370/230; 370/462; 710/22; 710/29; 710/117
(58) Field of Classification Search ............... None
   See application file for complete search history.

(56) References Cited

U.S. PATENT DOCUMENTS

| | | | |
|---|---|---|---|
| 5,611,053 A * | 3/1997 | Wu et al. ............... | 710/100 |
| 5,884,050 A * | 3/1999 | Wheeler et al. ......... | 710/107 |
| 7,379,777 B2 | 5/2008 | Chandhoke | |
| 7,406,531 B2 * | 7/2008 | Fuehrer et al. ......... | 709/232 |
| 7,689,727 B2 | 3/2010 | Chandhoke | |
| 7,882,312 B2 * | 2/2011 | Spencer ............... | 711/154 |
| 2001/0055323 A1 * | 12/2001 | Rowett et al. .......... | 370/537 |
| 2002/0062415 A1 * | 5/2002 | Wang et al. ............ | 710/240 |
| 2004/0030816 A1 * | 2/2004 | Knight et al. .......... | 710/52 |
| 2004/0160980 A1 * | 8/2004 | Miyoshi ............... | 370/462 |
| 2005/0160188 A1 * | 7/2005 | Bogin et al. ........... | 710/1 |
| 2005/0201420 A1 * | 9/2005 | Bhandari et al. ....... | 370/508 |
| 2008/0151753 A1 * | 6/2008 | Wynne ................. | 370/235 |
| 2008/0209251 A1 * | 8/2008 | Kottke ................. | 713/501 |
| 2009/0106761 A1 | 4/2009 | Chandhoke | |
| 2010/0005470 A1 * | 1/2010 | Simon et al. .......... | 718/103 |

FOREIGN PATENT DOCUMENTS

EP   1820309 A2 *   8/2007

OTHER PUBLICATIONS

Chung-Sheng Li, Yoram Ofek and Moti Yung, "'Time-driven Priority'" Flow Control for Real-time Heterogeneous Internetworking, IEEE, 1996, pp. 189-197.

Ahlem Mifdaoui, Fabrice Frances, and Christian Fraboul, "Real-Time Communication over Switched Ethernet for Military Applications," ACM 159593097X/05/0010, CoNEXT'05, Oct. 24-27, 2005, 2 pages.

* cited by examiner

*Primary Examiner* — Donald Mills
(74) *Attorney, Agent, or Firm* — Meyertons Hood Kivlin Kowert & Goetzel, P.C.; Jeffrey C. Hood; Mark S. Williams (57) ABSTRACT

System and method for controlling access to a bus. A Network Interface (NI) is coupled to a memory via the bus, and receives a schedule to a Direct Memory Access (DMA) controller on the NI. The schedule indicates one or more timeslots reserved for transmission of deterministic data, and further indicates one or more available timeslots which are not reserved for transmission of deterministic data. The NI receives first data for transmission onto the bus, during a first timeslot of the available timeslots, where the first data are received in a non-deterministic manner, and determines that the first timeslot is a reserved timeslots based on the schedule. The first data are buffered in a buffer memory during the first timeslot, and transferred to the first memory via the bus during a second timeslot after the buffering, where the second timeslot is one of the one or more available timeslots.

20 Claims, 6 Drawing Sheets

NETWORK TRAFFIC SHAPING FOR REDUCING BUS JITTER ON A REAL TIME CONTROLLER

FIELD OF THE INVENTION

The present invention relates to the field of real time control, and more particularly to a system and method for shaping or managing network traffic to reduce bus jitter on a real time controller.

DESCRIPTION OF THE RELATED ART

In modern real time controllers such as programmable logic controllers (PLCs) and distributed control systems (DCSs), human machine interface (HMI) and asynchronous supervisory data are typically transferred via standard Ethernet. These data are usually not considered time critical and hence do not require bounded latency, i.e., are not time critical and thus do not require real time performance. On the other hand, time critical data required by the user logic on the real time controller is usually updated via some deterministic or dedicated bus (on which the schedule is predefined and controllable).

Figure 1:
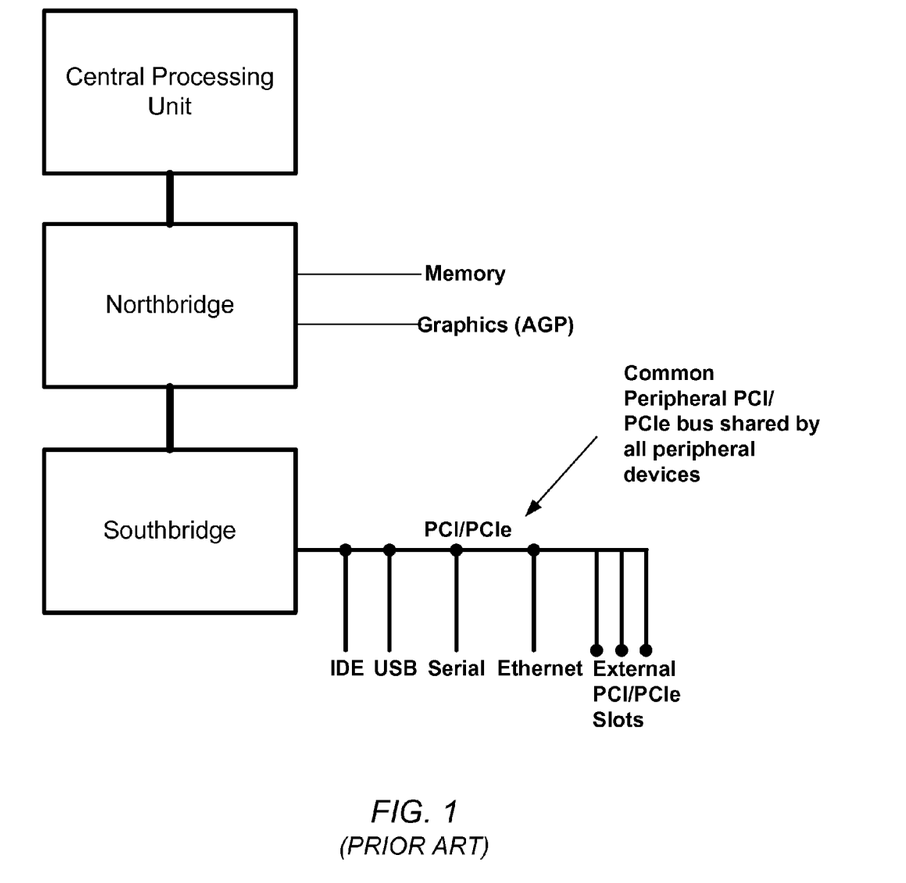
FIG. 1 illustrates an exemplary architecture of a real time controller, according to the prior art.

Traditional system architectures generally connect both types of buses (non-deterministic Ethernet and some flavor of a deterministic/dedicated bus, e.g., EtherCAT, etc.) to internal IO buses that are shared by all devices, e.g., a PCI bus. FIG. 1 illustrates such a controller architecture, where a Central Processing Unit (CPU) is coupled to memory and graphics processor (AGP) via a northbridge, and through the northbridge to a peripheral bus (PCI/PCIe) via a southbridge. As may be seen, various IO buses are coupled to the PCI/PCIe bus, specifically, IDE (Integrated Device Electronics), USB (Universal Serial Bus), Serial, Ethernet, and a plurality of external PCI/PCIe slots, although any other buses may be used. Various devices may thus be coupled to the controller via these buses, including local and/or remote devices, some of which may be under the control of the controller, and others which may not. Similarly, some of the devices may communicate asynchronously, i.e., non-deterministically, such as devices coupled to the Ethernet bus, and others may communicate deterministically, e.g., according to a specified schedule. Thus, both deterministic and non-deterministic buses share the peripheral IO bus in the controller.

The northbridge typically includes an integrated memory controller that directs data to memory. For example, the memory controller may be provided with a memory access arbiter unit to decide which memory request will be granted priority to the memory controller. If the arbitration scheme is fixed, then the highest memory access priority is always assigned to the CPU. If the arbitration scheme is adaptive, then the priority changes based on a scheme such that memory access requests that are refused are assigned progressively higher priority rankings until they are granted service.

However, in prior art systems that utilize this architecture, since the non-deterministic bus (Ethernet) does not follow a schedule, data from it may arrive at any time, thereby preventing or postponing memory access of data from the deterministic bus, if present, and thereby increasing jitter on the deterministic bus.

SUMMARY OF THE INVENTION

Various embodiments of a system and method for shaping or managing network traffic to reduce bus jitter on a real time controller are presented below.

A Network Interface (NI) may be coupled to a memory via the bus. For example, the NI may be included in or coupled to a real-time controller. First, a schedule may be received to a Direct Memory Access (DMA) controller on a Network Interface (NI), where the NI is coupled to a first memory via the bus. The schedule may indicate one or more timeslots reserved for transmission of deterministic data, and may further indicate one or more available timeslots which are not reserved for transmission of deterministic data, where the bus receives deterministic data during the one or more timeslots reserved for transmission of deterministic data according to the schedule.

Note that the schedule specifies timeslots in a cycle, where the cycle is repeated, and thus, the scheduled timeslots are also repeated. Note that the term "schedule" is intended to refer to any information that specifies timeslots for data transfer as described herein.

The NI may receive first data for transmission onto the bus, during a first timeslot of the one or more available timeslots, where the first data may be received in a non-deterministic manner. In other words, first data may be received from an asynchronous source during the first time slot. For example, in some embodiments, supervisory control data may be communicated in this way, as opposed to scheduled or deterministic data, e.g., provided via a data acquisition (DAQ) card or motion control device.

A determination may be made that the first timeslot is one of the one or more reserved timeslots based on the schedule. Thus, the first timeslot is reserved for deterministic data transfer, but the received first data are non-deterministic. As a result, the first data may be buffered in a buffer memory during the first timeslot, e.g., in a buffer memory on the NI, although other buffer memory locations may be used as desired.

A determination may be made that a second timeslot subsequent to the first timeslot is one of the one or more available timeslots based on the schedule. Thus, the second timeslot is not reserved for deterministic data transfer and thus is available for use with respect to non-deterministic data.

The first data may then be transferred to the first memory (e.g., to RAM, processor or CPU memory, etc.) via the bus during the second timeslot in response to the above determination that the second timeslot is one of the one or more available timeslots. Said another way, during one of the subsequent available timeslots (that are not reserved for deterministic data communications), the first data, which was received in a non-deterministic fashion, and buffered, may be transferred to the first memory. Thus, if the non-deterministic or asynchronous first data are received during a timeslot reserved for deterministic data, the first data may be held until a non-deterministic, i.e., available, timeslot occurs, and transferred to the first memory during that non-deterministic or available timeslot.

Thus, the reception of the non-deterministic data and subsequent transmittal to memory over the bus during an available timeslot does not interfere with scheduled deterministic data communications, which are performed only during timeslots reserved for such deterministic data transmission, because the transfer of the non-deterministic data is performed during an available timeslot that is not reserved for deterministic data communications.

In one embodiment, second data for storage in the memory may be received during the second timeslot, where the second data are received in a non-deterministic manner. A determination may be made that the second timeslot is one of the one or more available timeslots based on the schedule, and the second data may be transferred to the first memory via the bus during the second timeslot. In other words, if asynchronous or non-deterministic data are received during an available timeslot, the method may go ahead and transfer the asynchronous data to the first memory during that timeslot. Again, no interference occurs with deterministic data transfers. Note that the asynchronous data may be received from any asynchronous source, e.g., the first data or the second data may be received from one or more devices coupled to the NI via a non-deterministic network, e.g., via the Internet.

In a further embodiment, third data may be received for storage in the first memory during the first timeslot, where the third data include deterministic data. In other words, during the first timeslot, which, again, is reserved for deterministic communication, deterministic data may be received.

The third data may be transferred to the first memory via the bus during the first timeslot. Thus, in one embodiment, during the first timeslot, non-deterministic first data are received and buffered or stored on the NI, and third data, which include deterministic data, are also received during the first timeslot; however, only the deterministic third data are transferred over the bus to the first memory during the (deterministic) first timeslot.

In one embodiment, the first memory may be coupled to a functional unit, e.g., to a processor, or to a programmable hardware element. The functional unit may execute real time logic using the third data, where the functional unit accesses the third data from the first memory. Said another way, the functional unit may access the third data from the first memory and execute real time logic using the third data.

Thus, the bus may be available for transfer of deterministic data during the second timeslot.

As may be seen, using the above techniques, collisions between deterministic and non-deterministic data transfer, e.g., access to a bus, may be avoided by receiving and transferring non-deterministic data to memory during available timeslots (which are not reserved for deterministic communications), and, when asynchronous or non-deterministic data are received during a timeslot that is reserved for deterministic communications, holding that data until an available timeslot occurs, then transferring it during the available timeslot. Meanwhile, all deterministic data are transferred during timeslots reserved for that purpose. Note that since the deterministic data are sent and received on a schedule, deterministic data may never be received during an available time slot (i.e., a timeslot not reserved for deterministic communications).

However, in some embodiments, if deterministic data are received during an available timeslot, the NI may buffer that data, and transfer it during the next timeslot reserved for deterministic communications. Alternatively, in other embodiments, deterministic data received during a non-deterministic timeslot may be transferred to memory during that timeslot if no non-deterministic data transfers are pending.

Thus, in one embodiment, asynchronous data transfer from the non-deterministic, e.g., Ethernet, bus can be made to adhere to the schedule, e.g., orchestrated by a real time scheduler running on the system CPU or other functional unit, causing the first memory update from the non-deterministic bus (e.g., Ethernet) to transfer data into memory at predefined moments in time, thereby not affecting the performance of deterministic devices sharing the peripheral bus with it.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. application Ser. No. 11/875,043 titled "Programmable Controller with Multiple Processors Using a Scanning Architecture," filed Oct. 19, 2007.

U.S. Pat. No. 4,914,568 titled "Graphical System for Modeling a Process and Associated Method," issued on Apr. 3, 1990.

U.S. application Ser. No. 11/338,922, titled "System and Method for Automatically Updating the Memory Map of a Programmable Logic Controller to Customized Hardware", filed Jan. 24, 2006.

U.S. application Ser. No. 11/427,052, titled "System and Method for Automatically Updating the Memory Map of a Programmable Controller to Customized Hardware," filed Jun. 28, 2006.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Programmable Controller—programmable controllers may include programmable logic controllers (PLCs), programmable automation controllers (PACs), distributed control systems (DCSs), and/or other programmable controllers which utilize scanning architectures.

Task—A task may be included in a programmable controller and may itself include programs and variables, e.g., variables used by the programs. A task may define the schedule and/or manner in which the programs may be executed on the programmable controller. For execution, the programs in the task may be assigned an execution order within the task, i.e., the order defines priority of program execution. Additionally, in a multitasking environment, each task may be assigned a specified priority with respect to the other tasks.

Programmable Controllers

The following descriptions describe embodiments of systems which utilize PLCs, PACs, and/or DCSs. Note that embodiments herein described with respect to PLCs may equally apply to embodiments with PACs and/or DCSs, including implementations based on personal computers or workstations. Note however, that the programmable controllers are not limited to those described herein, and that other programmable controllers are envisioned.

The term "programmable automation controller" is intended to capture the full breadth of its ordinary meaning and at least includes the characteristics described herein. In general, PACs combine the features of normal PLCs, such as those described above, with the capabilities of computer system control systems, e.g., using a personal computer. In some cases, PACs may provide a more open, modular programming environment than provided by normal PLCs. Additionally, such PACs may provide the protection and stability provided by PLCs that personal computing systems generally lack. For example, the PACs may include a ruggedized housing for protection from the local environment which can sometimes be quite corrosive. Additionally, the PACs may be generally more stable than personal computing systems simply due to the nature of current standard personal computing operating systems. Thus, in some embodiments, at least one PAC may be used in conjunction with the architectures, systems, and methods described herein.

Additionally, the term "distributed control system" is also intended to capture the full breadth of its ordinary meaning and at least includes the characteristics described herein. In general, DCSs include one or more instruments or computing systems for implementing various processes, such as those described above in relation to the use of PLCs. Thus, similar to the above descriptions regarding PACs, one or more DCSs may be used in conjunction with the systems and methods described herein.

Figure 2A:
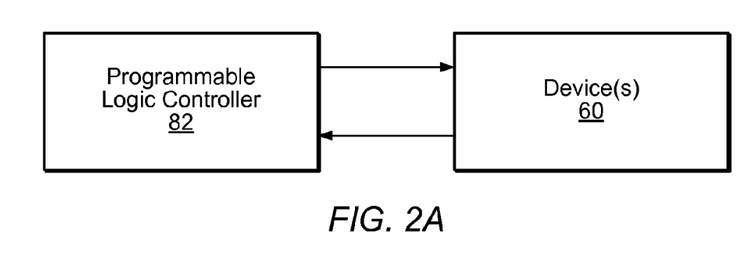
FIG. 2A illustrates a programmable logic controller coupled to one or more devices, according to one embodiment.

FIG. 2A—Programmable Logic Controller System

FIG. 2A illustrates a programmable logic controller (PLC) 82 suitable for implementing various embodiments of the present invention. The term "PLC" or "programmable logic controller" is intended to have the full breadth of its ordinary meaning, and at least includes the characteristics described herein.

The PLC 82, may include one or more processors as well as a memory medium(s) coupled to the processor on which one or more computer programs or software components may be stored. More specifically, the PLC 82 may include a plurality of processors, which execute and may be scheduled according to embodiments presented below. As used herein "processors" may include processor cores or processing chips. For example, a programmable controller with multiple processors may include a single processing chip with multiple cores (e.g., 2, 4, 8, etc.) or may include multiple processing chips (e.g., multiple central processing units), where each processing chip includes one or more processors. Multiple processors may refer to any combination of chips and cores. For example, a PLC with multiple processors may include two processing chips and one or both of the processing chips may include multiple cores. In this example, the term "processor" may refer to each of the processing cores of both of the processing chips, but may also refer to each of the processing chips themselves. In one embodiment, where the PLC includes two processing chips, and one has two cores, the term processors may refer to the two cores and the processing chip with a single core. In other words, in this example, the term processor may refer to any entity which is able to independently process information.

In some embodiments, the PLC 82 may include a Network Interface (NI), which may control access to a bus for communicating with memory in the PLC, as will be discussed in more detail below. In various embodiments, the NI may be implemented using one or more processors (with memory) and/or one or more programmable hardware elements (PHEs), e.g., FPGAs, etc. As used herein, the term "functional unit" may refer to either or both, i.e., one or more processors (with memory) and/or one or more programmable hardware elements.

Thus, a memory medium coupled to a processor may store one or more programs which are executable to perform the methods described herein. In some embodiments, the programs may include graphical programs. Additionally, or alternatively, one or more PHEs may be configured to perform embodiments of the methods disclosed herein. Various embodiments further include receiving or storing instructions and/or data implemented in accordance with the foregoing description upon a carrier medium.

More generally, embodiments of the methods disclosed herein may be implemented or performed via a NI comprised in a PLC, possibly in conjunction with other elements of the PLC.

As shown in FIG. 2A, the PLC 82 may be coupled to one or more devices, e.g., device(s) 60. In some embodiments, the devices may be coupled directly to the PLC via an electrical interface. The devices may also be coupled to the PLC 82 via an intermediary device, e.g., another PLC 82, a programmable hardware element (PHE), or other suitable devices. In some embodiments, one or more of the devices may be implemented at a remote location and may be coupled to the PLC 82 via a network, e.g., LAN, WAN, Internet, Intranet, etc. In one embodiment, the PLC 82 may communicate directly with the one or more devices, or, alternatively, an intermediary device may provide a network communication interface between the PLC 82 and the remote devices. In various embodiments, the PLC 82 may communicate with the remote devices directly, or via an intermediary device, using any of a variety of communication protocols, e.g., TCP/IP, GPIB, Ethernet (e.g., CSMA/CD), Local Talk (e.g., CSMA/CA), Token Ring, FDDI, ATM, NetBEUI, IPX/SPX, IPv6, CANopen, DeviceNet, PROFInet, EtherNet/IP, EtherCAT, Ethernet Powerlink, SERCOS, or other suitable communication protocols, as desired. In preferred embodiments, at least one of the devices may communicate with the PLC via a deterministic or real time transmission medium, e.g., EtherCAT. Thus, devices may be coupled to the controller via buses configured to communicate in a deterministic manner, and/or via buses configured to communicate in a non-deterministic manner.

In some embodiments, the PLC 82 may be coupled to a PHE, e.g., a field-programmable gate array (FPGA), which may provide a hardware interface between the PLC 82 and one or more coupled devices, e.g., device(s) 60. As indicated above, the devices may be local or remote to the PLC 82 and/or PHE, and may communicate with the PLC 82 via the PHE using any of various protocols. The devices may be of various types and may perform any of various tasks as will be described in more detail below.

In some embodiments, the PLC 82 may be included in or coupled to a chassis. In various embodiments, the chassis may include one or more module expansion slots operable to receive expansion modules. The expansion slots may be operable to receive any of a variety of expansion modules, including, PCI, PCI Express (PCIe), ISA, PXI, VXI, EtherCAT, GPIB, or other suitable form factors and/or card types. The expansion modules may be coupled to and may communicate with the PLC 82 via a backplane. For example, the backplane may include the programmable hardware element, e.g., the FPGA, which may operate to provide input and output to the PLC 82 from one or more devices included in or coupled to the chassis, e.g., the expansion modules plugged into the expansion slots or other devices coupled to the chassis. Additionally, in various embodiments, the backplane may implement any of a variety of buses, including, but not limited to, a VXI (VME eXtensions for Instrumentation) bus, an EtherCAT bus, a GPIB (General Purpose Interface Bus) bus, a PXI (PCI eXtensions for Instrumentation) bus, a CAN bus, a Profibus bus, a serial bus, a parallel bus, or other suitable buses. In some embodiments, where the backplane includes or is a PHE, a user may be able to program the PHE such that the backplane performs operations on the input and output from the PLC 82 and/or the devices coupled to the chassis.

In some embodiments, the PLC 82 may be coupled to a plurality of different programmable hardware elements, e.g., FPGAs, each communicating with the PLC 82 locally and/or remotely. One or more of the PHEs may be coupled to the PLC 82 or chassis via a networked connection and may provide I/O from devices or expansion modules coupled to the one or more remote PHEs. Similar to above, the PHEs may implement one or more of the above listed, or other, suitable protocols for network communication.

In one embodiment, the PLC 82 may be coupled to one or more PHEs, which may provide a hardware interface between the PLC 82 and one or more devices, and one or more other devices. The one or more other devices may be coupled to the PLC 82 directly and/or via an intermediary device.

In another embodiment, the PLC 82 may be coupled to a PHE which may be coupled to one or more devices and one or more other PHEs. In this embodiment, the PHE may provide a hardware interface between the one or more devices and the one or more other PHEs (each of which may provide a hardware interface for at least another device), and the PLC 82.

Figure 2B:
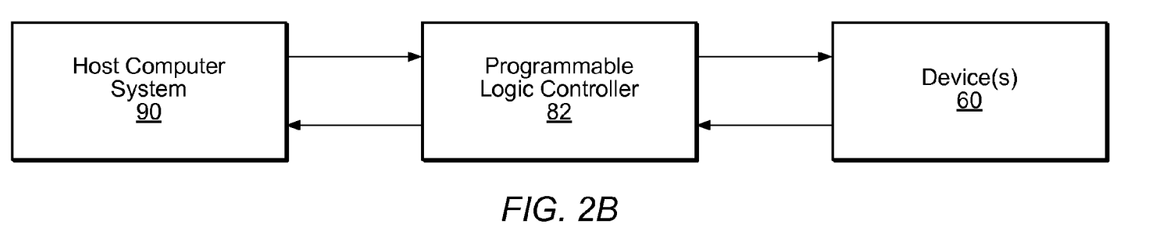
FIG. 2B illustrates a system comprising a programmable logic controller (PLC), one or more devices, and a host computer system, that may implement one embodiment of the present invention.

FIG. 2B—Programmable Logic Controller Coupled to a Host Computer System

FIG. 2B illustrates a system including the programmable logic controller 82 coupled to the device(s) 60 as well as a host computer system 90. The PLC 82 may be coupled to the host computer system 90 via a network or a computer bus using any of various networks and protocols described above, among others. The computer system 90 may be any of various types, as desired. In some embodiments, a program executing on the computer system 90 may provide a human-machine interface (HMI) for the PLC 82. For example, the program may be an HMI application executing on the host computer, and facilitating user interaction with the PLC 82. In this embodiment, the program may receive input from a user on host computer system 90 with regard to instructions for the PLC 82, which may then provide input to the PLC 82 accordingly. In some embodiments, the instructions may also be directed toward, and subsequently provided to, the PHE providing the hardware interface between the device(s) and the PLC 82.

In one embodiment, a program, e.g., a graphical program, may be downloaded to and executed on the PLC 82, and/or one or more devices, e.g., one or more PHEs, coupled to the PLC 82. This program may act as controller engine(s) or scheduler(s) on the PLC 82. In some embodiments, the program may provide a runtime environment for tasks executing on the PLC 82. For example, an application development environment with which the program is associated (e.g., the LabVIEW graphical program development environment, provided by National Instruments Corporation) may provide support for downloading a program for execution on the PLC 82 in a real time system.

In some embodiments, the program, e.g., the graphical program, may execute in a distributed fashion. For example, at least one portion of the program, e.g., at least one portion of a block diagram of the program, may be implemented and/or executed on one or more PHEs coupled to the PLC 82 and another portion, e.g., another portion of the block diagram, may be implemented and/or executed on the PLC 82. In one embodiment, one portion, e.g., the program's GUI, of the program may be executed on the host computer system coupled to the PLC 82. More specifically, in one embodiment, a portion of the graphical program may execute on the PLC 82 (e.g., the PLC may be configured according to the portion of the graphical program) and another portion of the graphical program (e.g., including the front panel of the graphical program) may execute (e.g., concurrent to execution of the graphical program portion on the PLC 82) on the computer system 90, e.g., to provide an MMI for the graphical program portion executing on the PLC 82.

In further embodiments, the PLC 82 may be a "soft" PLC, i.e., a computer program running on a computer system such as host computer system 90 that mimics the operation of a standard PLC. The computer program may be a graphical program, such as a LabVIEW graphical program, and may operate to perform all the functionality of PLCs described herein.

Figure 2C:
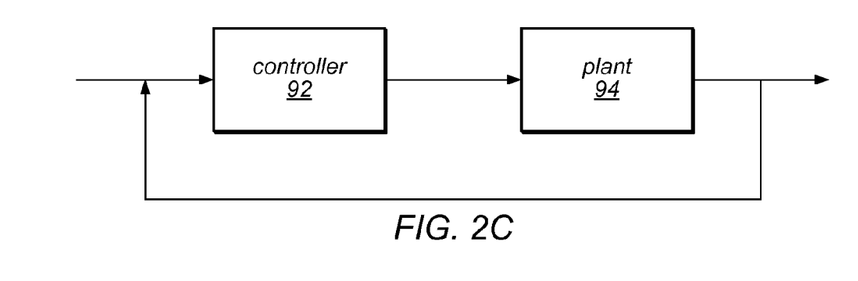
FIG. 2C illustrates a control system comprising a controller and a plant, according to one embodiment

FIG. 2C—Programmable Logic Controller Coupled to a Plant

FIG. 2C illustrates a general high-level block diagram of a generic control and/or simulation system which comprises a controller 92 and a plant 94. The controller 92 represents a control system/algorithm for controlling the plant 94. The plant 94 is or represents the system the user may be trying to control. For example, if the user is designing an ECU for a car, the controller 92 is the ECU and the plant 94 is the car's engine (and possibly other components such as transmission, brakes, and so on.) As shown, a user may create a program or algorithm that specifies or implements the functionality of one or both of the controller 92 and the plant 94. For example, a control engineer may use a modeling and simulation tool to create a model of the plant 94 and/or to create the algorithm (graphical program) for the controller 92.

In one embodiment of the invention, one or more programs may be created which are used in performing Hardware in the Loop (HIL) simulation. Hardware in the Loop (HIL) refers to the execution of the plant model in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

Once the algorithm or program is developed, the controller 92 may be used to control the plant 94.

Exemplary Systems

As indicated above, embodiments of the present invention may apply to programmable controllers that include or are coupled to NIs (Network Interfaces) according to the techniques disclosed herein. Embodiments of the present invention may be applicable in systems involved with performing test and/or measurement functions; controlling and/or modeling instrumentation or industrial automation hardware; hardware-in-the-loop testing; rapid control prototyping, modeling and simulation functions, e.g., modeling or simulating a device or product being developed or tested; vision systems; process control; motion control; brake-by-wire; steer-by-wire; or throttle-by-wire, among others.

However, it is noted that embodiments of the present invention may be used for a plethora of applications and are not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as network control, network monitoring, financial systems, games, etc.

In the embodiments of FIGS. 2A, 2B, and 2C discussed above, one or more of the various devices may couple to each other over a network, such as the Internet. Graphical software programs which perform data acquisition, analysis and/or presentation, e.g., for measurement, instrumentation control, industrial automation, modeling, or simulation, such as in the applications shown in FIGS. 2A, 2B, and 2C, may be referred to as virtual instruments.

Figure 3:
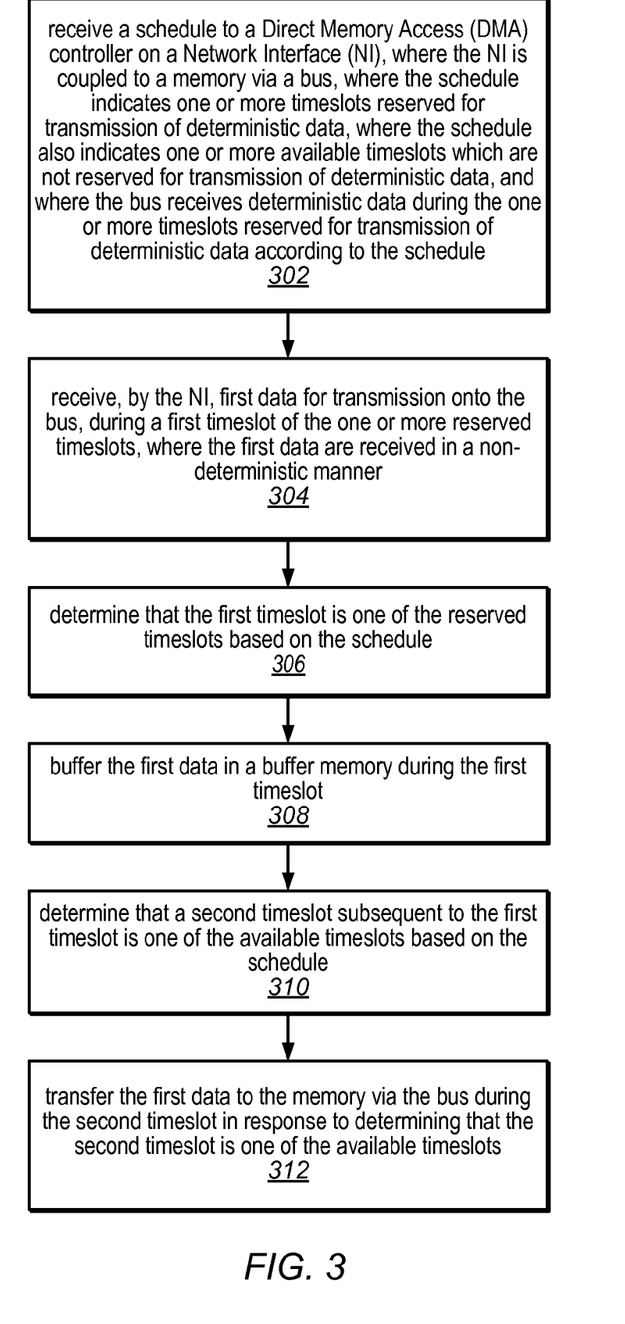
FIG. 3 is a flowchart diagram illustrating one embodiment of a method for controlling access to a bus.

FIG. 3—Flowchart of a Method for Controlling Access to a Bus

FIG. 3 illustrates a method for controlling access to a bus, e.g., a peripheral bus, in a real time control system. The method shown in FIG. 3 may be used in conjunction with any of the computer systems or devices shown in the above Figures, among other devices, and may be performed by one or more functional units included in or coupled to a network interface. In various embodiments, some of the method elements shown may be performed concurrently, in a different order than shown, or may be omitted. Additional method elements may also be performed as desired. As shown, this method may operate as follows.

First, in 302, a schedule may be received to a Direct Memory Access (DMA) controller on a Network Interface (NI), where the NI is coupled to a first memory via the bus. The schedule may indicate one or more timeslots reserved for transmission of deterministic data, and may further indicate one or more available timeslots which are not reserved for transmission of deterministic data, where the bus receives deterministic data during the one or more timeslots reserved for transmission of deterministic data according to the schedule. Note that the schedule specifies timeslots in a cycle, where the cycle is repeated, and thus, the scheduled timeslots are also repeated. More specifically, in one embodiment, the one or more reserved timeslots are of predetermined duration and repeat in a cyclical manner. Note further that the schedule may assume any form as desired. In other words, the term "schedule" is intended to refer to any information that specifies timeslots for data transfer as described herein.

Thus, the schedule for transmitting data on the bus may include one or more timeslots reserved for transmission of deterministic data, and one or more available timeslots that are not reserved for transmission of deterministic data, and the bus may receive deterministic data during the one or more timeslots reserved for transmission of deterministic data in accordance with the schedule.

In 304, the NI may receive first data for transmission onto the bus, during a first timeslot of the one or more available timeslots, where the first data may be received in a non-deterministic manner. In other words, first data may be received from an asynchronous source during the first time slot. For example, in some embodiments, supervisory control data may be communicated in this way, as opposed to scheduled or deterministic data, e.g., provided via a data acquisition (DAQ) card or motion control device.

In 304, a determination may be made that the first timeslot is one of the one or more reserved timeslots based on the schedule. Thus, the first timeslot is reserved for deterministic data transfer, but the first data are non-deterministic.

In 308, the first data may be buffered in a buffer memory during the first timeslot. For example, in one embodiment, the first data may be buffered (stored temporarily) in a buffer memory on the NI, although other buffer memory locations may be used as desired.

In 310, a determination may be made that a second timeslot subsequent to the first timeslot is one of the one or more available timeslots based on the schedule. Thus, the second timeslot is not reserved for deterministic data transfer, and thus, is available for use with respect to non-deterministic data.

In 312, the first data may be transferred to the first memory (e.g., to RAM, processor or CPU memory, etc.) via the bus during the second timeslot in response to the above determination that the second timeslot is one of the one or more available timeslots. Said another way, during one of the available timeslots (that are not reserved for deterministic data communications), the first data, which was received in a non-deterministic fashion in 304, and buffered in 308, may be transferred to the first memory. Thus, if the non-deterministic or asynchronous first data are received during a timeslot reserved for deterministic data, the first data may be held until a non-deterministic, i.e., available, timeslot occurs, and transferred to the first memory during that non-deterministic or available timeslot.

Thus, the reception of the non-deterministic data and subsequent transmittal to memory over the bus during an available timeslot does not interfere with scheduled deterministic data communications, which are performed only during timeslots reserved for such deterministic data transmission, because the transfer of the non-deterministic data is performed during an available timeslot that is not reserved for deterministic data communications.

In one embodiment, second data for storage in the memory may be received during the second timeslot, where the second data are received in a non-deterministic manner. A determination may be made that the second timeslot is one of the one or more available timeslots based on the schedule, and the second data may be transferred to the first memory via the bus during the second timeslot. In other words, if asynchronous or non-deterministic data are received during an available timeslot, the method may go ahead and transfer the asynchronous data to the first memory during that timeslot. Again, no interference occurs with deterministic data transfers. Note that the asynchronous data may be received from any asynchronous source, e.g., the first data or the second data may be received from one or more devices coupled to the NI via a non-deterministic network, e.g., via the Internet.

In a further embodiment, third data may be received for storage in the first memory during the first timeslot, where the third data include deterministic data. In other words, during the first timeslot, which, again, is reserved for deterministic communication, deterministic data may be received.

The third data may be transferred to the first memory via the bus during the first timeslot. Thus, in one embodiment, during the first timeslot, non-deterministic first data are received and buffered or stored on the NI, and third data, which include deterministic data, are also received during the first timeslot; however, only the deterministic third data are transferred over the bus to the first memory during the (deterministic) first timeslot.

In one embodiment, the first memory may be coupled to a functional unit, e.g., to a processor, or to a programmable hardware element. The functional unit may execute real time logic using the third data, where the functional unit accesses the third data from the first memory. Said another way, the functional unit may access the third data from the first memory and execute real time logic using the third data.

Thus, the bus may be available for transfer of deterministic data during the second timeslot.

As may be seen, using the above technique, collisions between deterministic and non-deterministic data transfer, e.g., access to a bus, may be avoided by receiving and transferring non-deterministic data to memory during available timeslots (which are not reserved for deterministic communications), and, when asynchronous or non-deterministic data are received during a timeslot that is reserved for deterministic communications, holding that data until an available timeslot occurs, then transferring it during the available timeslot. Meanwhile, all deterministic data are transferred during timeslots reserved for that purpose. Note that since the deterministic data are sent and received on a schedule, deterministic data may never be received during an available time slot (i.e., a timeslot not reserved for deterministic communications).

However, in some embodiments, if deterministic data are received during an available timeslot, the NI may buffer that data, and transfer it during the next timeslot reserved for deterministic communications. Alternatively, in other embodiments, deterministic data received during a non-deterministic timeslot may be transferred to memory during that timeslot if no non-deterministic data transfers are pending.

Thus, in one embodiment, asynchronous data transfer from the non-deterministic, e.g., Ethernet, bus can be made to adhere to the schedule, e.g., orchestrated by a real time scheduler running on the system CPU or other functional unit, causing the first memory update from the non-deterministic bus (e.g., Ethernet) to transfer data into memory at predefined moments in time, thereby not affecting the performance of deterministic devices sharing the peripheral bus with it.

EXAMPLE EMBODIMENTS

Figure 4:
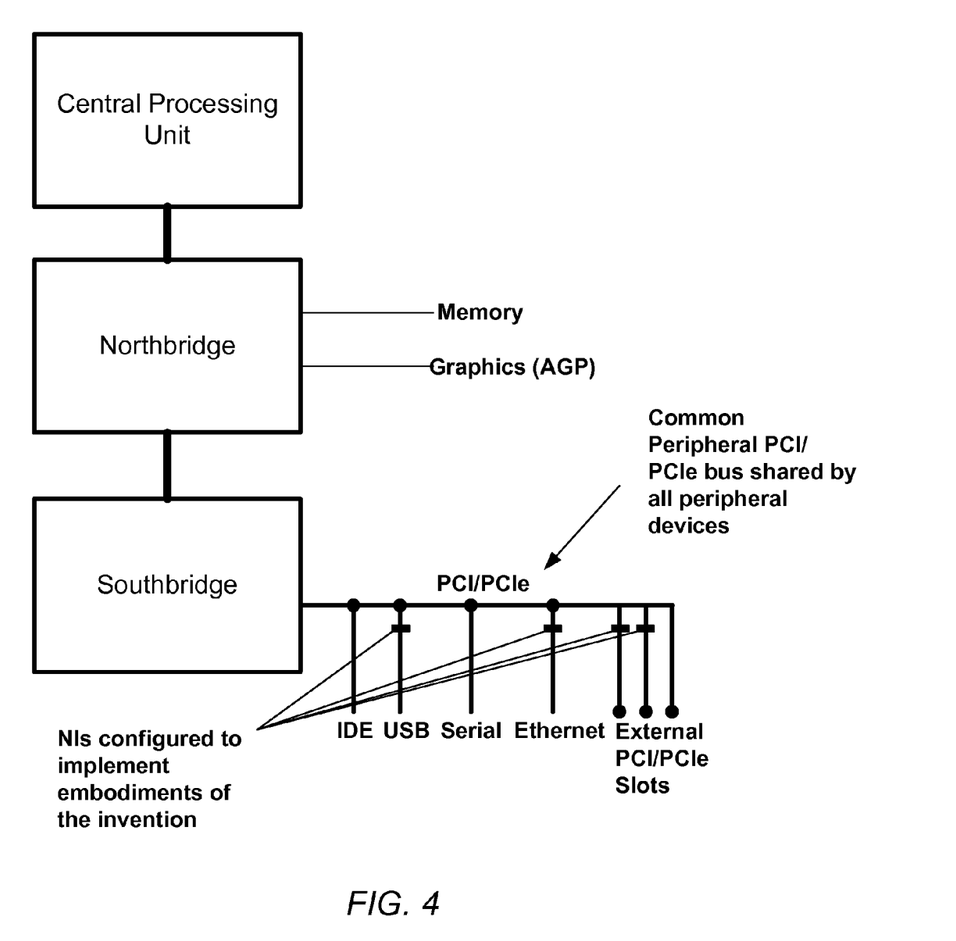
FIG. 4 illustrates an exemplary architecture of a real time controller, according to one embodiment.
Figure 5:
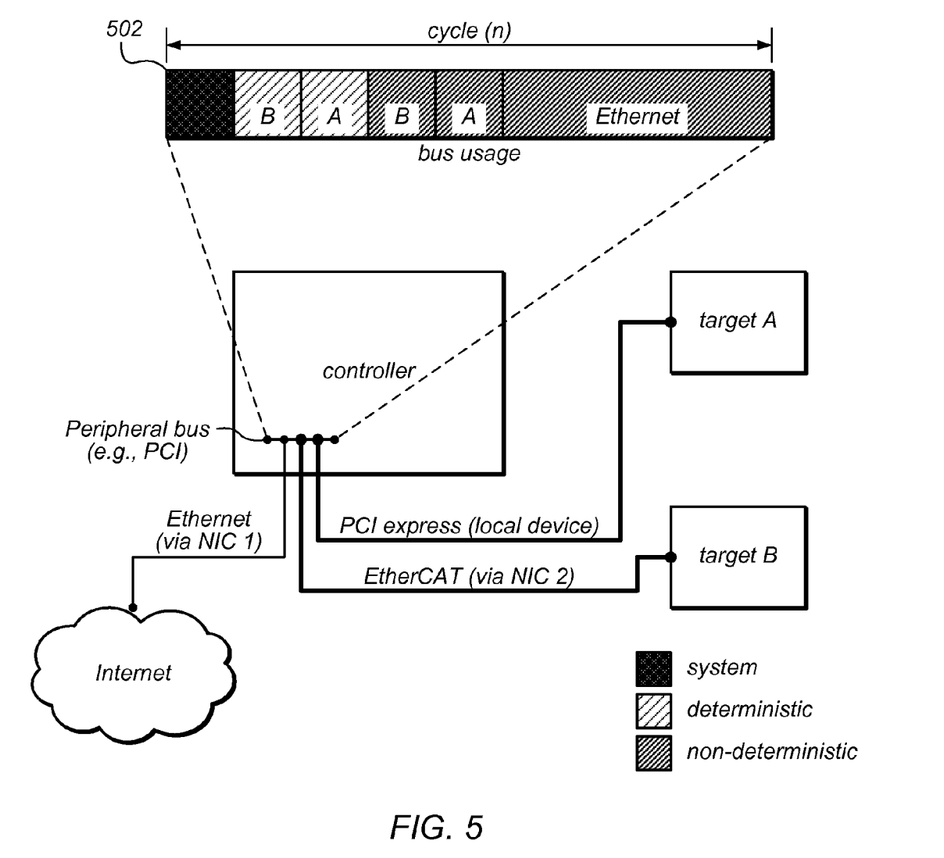
FIG. 5 illustrates a configuration for scheduled bus access, according to one embodiment.

FIGS. 4 and 5 illustrate exemplary systems implementing embodiments of the techniques disclosed herein. As noted above, in some embodiments, the above method for controlling access to a bus may be implemented by a NI (Network Interface), which may be coupled to or included in a control system. The NI may include an input for receiving a signal, one or more functional units coupled to the input and to a bus, e.g., a peripheral bus, such as a PCI/PCIe bus, where the bus is further coupled to a memory, e.g., the first memory. In other words, the NI may be coupled to a memory, e.g., the first memory, via the bus.

For example, in one embodiment, the NI may be included in a real-time controller, e.g., a PLC. FIG. 4 illustrates a system architecture for a controller in which both non-deterministic (e.g., Ethernet, USB, etc.) and deterministic (i.e., some type of real time or dedicated bus) buses are coupled to an internal IO bus shared by all devices coupled to the controller, in this case, a PCI/PCIe bus. As with the architecture of FIG. 1, in this embodiment, these IO buses connect to an IO controller hub (i.e. Southbridge) which is in turn connected to a corresponding Northbridge through a high speed channel, and which directs data to memory. However, in this embodiment, and as shown in FIG. 4, each bus providing asynchronous data to the controller may be configured with a NI that may operate to transmit otherwise asynchronous data only at appropriate times, i.e., only during available timeslots in the cycle. Thus, for example, since Ethernet is a non-deterministic transmission medium, a NIC (Network Interface Card—specific to Ethernet) may be included that may be configured to perform embodiments of the method of FIG. 3, e.g., receiving asynchronous or non-deterministic data, and transmitting this data only during available timeslots, as described above, thus avoiding collisions with deterministic data transfers.

FIG. 5 illustrates an example configuration in which a real time controller is connected to two end point systems, target A and target B, as well as to a standard Ethernet bus for supervisory communication. More specifically, in this exemplary embodiment, Ethernet (non-deterministic), EtherCAT (deterministic), and PCI express (PCIe) (deterministic, e.g., for connecting to a local controlled device, specifically, target A) buses are connected to a common peripheral bus, e.g., a PCI/PCIe bus, whereby communications between devices coupled to those buses and the controller may be facilitated.

Note that in some embodiments, it is only buses that provide non-deterministic data that may be configured with a NI that implements an embodiment of the invention. Note further that the non-deterministic nature of the Ethernet bus is denoted in FIG. 5 via a thin line, whereas the deterministic buses (PCIe (local device) and EtherCAT) are denoted with a heavy line. Thus, for example, NIC1, used by the Ethernet bus, is configured to implement an embodiment of the invention, since data received over Ethernet are asynchronous, whereas NIC 2, required by the EtherCAT bus due to being based on Ethernet, may simply be a standard NIC, since EtherCAT is deterministic. Target A is locally controlled to communicate deterministically, and thus, also does not require the techniques disclosed above.

In other words, both target A and target B communicate with the controller via deterministic buses, and thus both devices are capable of following a timed data transfer schedule, e.g., received by a DMA controller on the NI from the controller, and transfer data only on predetermined time slots. Both of these targets are assumed to be configurable by the real time controller, e.g., to communicate deterministically according to the schedule. NI 1 on the other hand is connected to the Internet (via Ethernet) and can be accessed by multiple targets not under the control of the controller.

Note that all three devices may arbitrate for access to the same internal peripheral bus whenever they need to transfer data into memory, e.g., into CPU memory, i.e., the controller's system memory, RAM, cache, etc. In some embodiments, all three devices support device initiated DMA, which may enable them to read and write data directly into the controller's system memory.

As FIG. 5 indicates, in each cycle, represented in the Figure as cycle (n), deterministic data may be isochronously transferred first by target device B using EtherCAT as the bus, followed by the target A, where the deterministic timeslots are denoted by light or sparse hatching. The subsequent three timeslots are for asynchronous communications, and are denoted by heavy or dense hatching. Note that only asynchronous data are transferred via Ethernet, and that in this example, both target B and target A may also transfer some amount of asynchronous data every cycle; however, since these devices are configured to communicate deterministically, e.g., according to a schedule, the asynchronous data may automatically be transferred per the specified schedule. Further details of the scheduled transfers are provided below with reference to FIG. 6.

In one embodiment, to implement the above techniques for data communication, the real time scheduler on the controller may ensure that clocks on target A and target B are synchronized in phase. This can be achieved by any of various means, and is beyond the scope of this disclosure. Once the clocks are synchronized, appropriate time slots for both targets may be configured. The time slots may be calculated based on maximum data to be transferred every cycle by each target taking propagation time into account. This way, the targets do not try to send data at the same time, thus avoiding the need for memory access arbitration. However, as noted above, since any devices connected to Ethernet (e.g., over the Internet) are not under direct control of the real time scheduler of the controller, data may arrive at any time, and so may require the techniques disclosed herein (e.g., implemented in NIC 1) to retain the advantage gained by scheduling traffic from target A and target B.

In one embodiment, a network interface (NI) with the following properties may be provided:

The peripheral bus, e.g., PCI/PCIe bus, access of the NI may be programmatically controllable, thus allowing the scheduler to turn its bus access ON and OFF at appropriate times.

Alternatively, a way to synchronize the local clock on the NI to a global time base may be provided. Using this global time base, a methodology similar to that used with respect to deterministic targets A and B may be employed, in which case the NI may be configured with a periodic time and an access time. When the periodic time triggers, the NI may turn ON access to the peripheral bus (and thereby memory), and, after access time expires, may turn access to the peripheral bus OFF. Additionally, in one embodiment, a start time may be used for an "in phase" operation with other devices sharing the bus. This process may be repeated every cycle.

The network interface (or, in the case of Ethernet, a Network Interface Card) may be capable of buffering (Ethernet) frames even when access to the peripheral bus (and hence memory) is disabled, thus allowing the frame data to be transferred when the opportunity arises, e.g., during an available timeslot not reserved for other, deterministic, data transfer.

Figure 6:
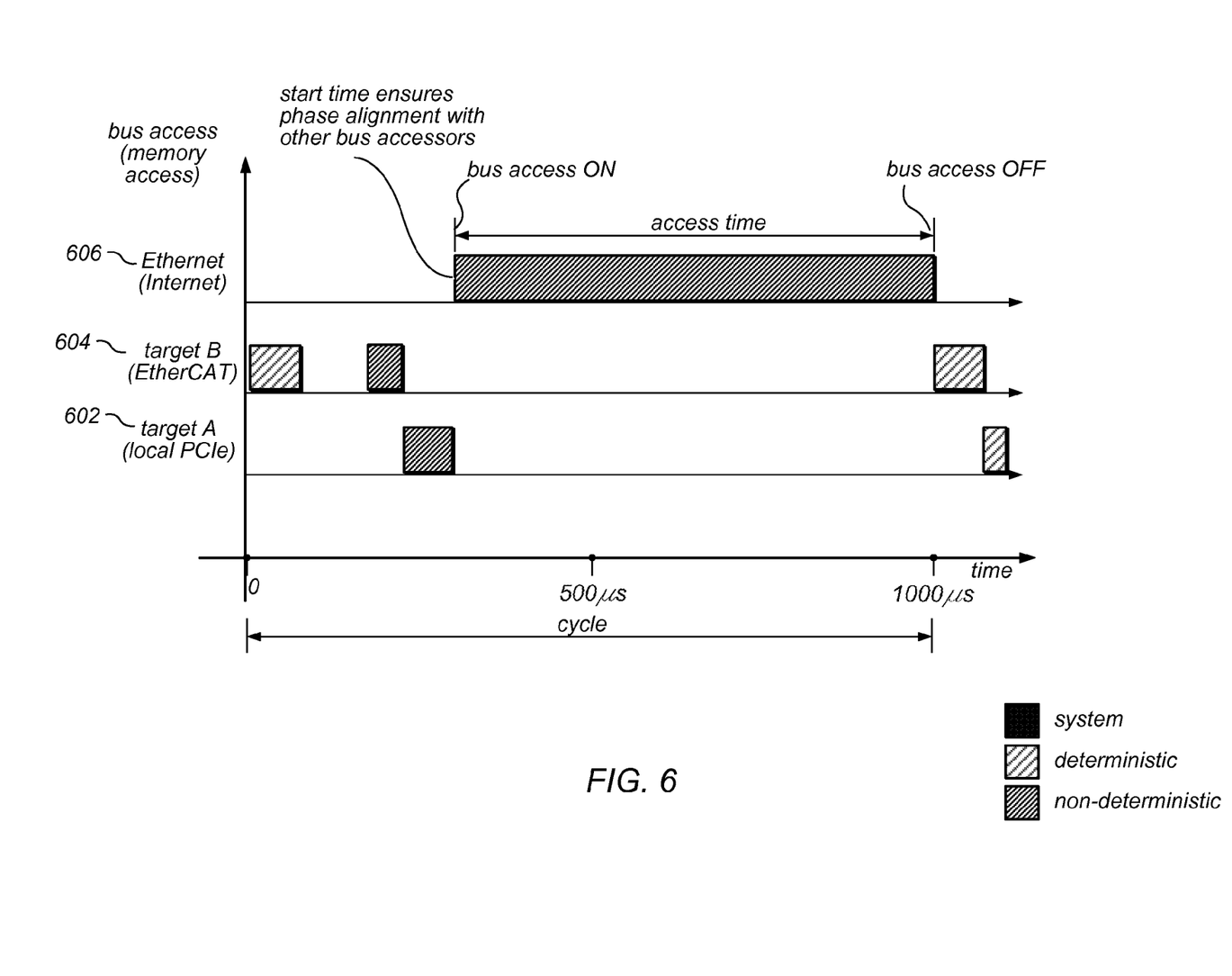
FIG. 6 illustrates an exemplary timing diagram, according to one embodiment.

FIG. 6 illustrates an exemplary timing diagram showing bus access in a scheduled manner over the course of a cycle (actually, slightly longer), according to one embodiment, where, as with FIG. 5, access for deterministic data transfers is indicated by light or sparse hatching, and access for non-deterministic or asynchronous data transfers is denoted by dark or heavy hatching. As shown, the timing diagram specifies access times for the three targets/buses of FIG. 5, specifically, target A 602, which is a local PCIe device controlled by the controller and thus deterministic, target B 604, which is an EtherCAT device, and thus deterministic, and Ethernet 602, which may couple to various devices over the Internet (or some other network), and is asynchronous, i.e., undeterministic.

As may be seen, in this embodiment, at the beginning of the cycle, access is provided for transfer of deterministic data for target B, followed (after a pause) by access for transfer of data for target B, which is immediately followed by access for transfer of asynchronous data for target C, followed immediately by access for transfer of asynchronous data for Ethernet. Finally, successive access for transfer of deterministic data is provided for Targets B and A, respectively. Thus, as noted above, deterministic and non-deterministic data transfers for targets A and B, both of which are controlled by the real-time controller, are performed per the specified schedule, and the data transfers over Ethernet, all of which are asynchronous, are restricted to the access time period shown. Note that according to this timing diagram, none of the devices has need to arbitrate access to the bus, since none of the access times overlap. Note, however, that with regard to the Ethernet transfers, as discussed above, devices communicating over Ethernet may send data to the controller, e.g., to the NIC, at any time, these data may only be transferred to memory during the specified access time, being buffered and held otherwise.

Thus, using these properties of the NI, the network traffic may be shaped so as to eliminate the need for any memory arbitration from devices sharing the peripheral bus, thus providing very repeatable and reliable bus access, and thereby reducing the bus jitter.

Note that the size of the buffer and speed of the network may define how long the peripheral bus access can be held off before frames (e.g., Ethernet frames) are dropped. Since the asynchronous bus typically handles non-critical data that is typically retransmitted, this will generally not be a problem. Note that most network switches and routers implement some form of traffic shaping algorithm which results in slowing down the network and occasionally dropping frames, and hence the techniques disclosed herein do not introduce any radical new behaviors to Ethernet.

While FIGS. 5 and 6 present exemplary embodiments directed to Ethernet, it should be noted that the techniques disclosed herein may also be applied to any other type of asynchronous transmission medium, e.g., USB (including USB 2), and so forth, as desired.

In one embodiment, the NI may implement an incomplete stack, including a physical layer and a Media Access Control (MAC) layer. In other words, the NI may not implement a full network communication stack.

As noted above, in some embodiments, the techniques disclosed herein may be used for real-time applications and systems. For example, the NI may be coupled via the bus to a real-time control system, where the first memory is a system memory for the real-time control system, and where the schedule is received from the real-time control system via the bus. In one embodiment, the real-time control system may include a real-time scheduler for managing the schedule.

The real-time control system may be of any type desired. For example, in various embodiments, the real-time control system may be or include a motion control system, a process control system, a brake-by-wire system, a throttle-by-wire system, or a steer-by-wire system, among others.

It should be noted that the above described scheduled access to the bus may be used for transferring data both to and from the first memory. In other words, the techniques disclosed herein may be used not only to transfer data from the devices to the first memory via their respective buses (without arbitration), but may also be used to transfer data from the first memory to the devices.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for controlling access to a bus, the method being implemented by a Network Interface (NI), wherein the NI is coupled to a first memory via the bus, the method comprising:

receiving, by a Direct Memory Access (DMA) controller on the NI, a schedule, wherein the schedule indicates one or more timeslots reserved for transmission of deterministic data, wherein the schedule also indicates one or more available timeslots which are not reserved for transmission of deterministic data, wherein the bus receives deterministic data during the one or more timeslots reserved for transmission of deterministic data according to the schedule;

receiving, by the NI, first data for transmission onto the bus during a first timeslot of the one or more reserved timeslots, wherein the first timeslot is not an available timeslot, and wherein the first data are received in a non-deterministic manner;

determining that the first timeslot is one of the one or more reserved timeslots based on the schedule;

buffering the first data in a buffer memory during the first timeslot; and transferring the first data to the first memory via the bus during a second timeslot, wherein the second timeslot is one of the one or more available timeslots, wherein said transferring is performed after said buffering.

2. The method of claim 1, further comprising:

receiving second data for storage in the first memory during the second timeslot, wherein the second data are received in a non-deterministic manner;

determining that the second timeslot is one of the one or more available timeslots based on the schedule; and transferring the second data to the first memory via the bus during the second timeslot.

3. The method of claim 2, wherein the second data are received from one or more devices coupled to the NI via a non-deterministic network.

4. The method of claim 2, wherein the first memory is coupled to a functional unit, the method further comprising:
receiving third data for storage in the first memory during the first timeslot, wherein the third data comprise deterministic data;
determining that the first timeslot is one of the one or more reserved timeslots based on the schedule;
transferring, during the first time slot, the third data to the first memory via the bus; and
the functional unit executing real time logic using the third data, wherein the functional unit accesses the third data from the first memory;
wherein the bus is available for transfer of deterministic data during the first timeslot.

5. The method of claim 1, wherein the NI implements an incomplete stack, comprising a physical layer and a Media Access Control (MAC) layer.

6. The method of claim 1, wherein the NI is coupled via the bus to a real-time control system, wherein the first memory is a system memory for the real-time control system, wherein the control information is received from the real-time control system via the bus.

7. The method of claim 6, wherein the real-time control system comprises a motion control system.

8. The method of claim 6, wherein the real-time control system comprises a process control system.

9. The method of claim 6, wherein the real-time control system comprises one or more of:
a brake-by-wire system;
a throttle-by-wire system; or
a steer-by-wire system.

10. The method of claim 1, wherein the one or more timeslots are of predetermined duration and repeat in a cyclical manner.

11. A Network Interface (NI) for controlling access to a bus, comprising:
an input for receiving a signal; and
one or more functional units coupled to the input and to a bus;
wherein the bus is coupled to a memory;
wherein the one or more functional units are configured to:
receive a schedule to a Direct Memory Access (DMA) controller on the NI, wherein the schedule indicates one or more available timeslots in a schedule which are not reserved for transmission of deterministic data, wherein the schedule also indicates one or more timeslots reserved for transmission of deterministic data, wherein the bus receives deterministic data during the one or more timeslots reserved for transmission of deterministic data according to the schedule;
wherein the schedule indicates one or more timeslots reserved for transmission of deterministic data, wherein the schedule also indicates one or more available timeslots which are not reserved for transmission of deterministic data, wherein the bus receives deterministic data during the one or more timeslots reserved for transmission of deterministic data according to the schedule;
receiving first data for transmission onto the bus, during a first timeslot of the one or more reserved timeslots, wherein the first timeslot is not an available timeslot, and wherein the first data are received in a non-deterministic manner;
determine that the first timeslot is one of the one or more reserved timeslots based on the schedule;
buffer the first data in a buffer memory during the first timeslot; and
transfer the first data to the first memory via the bus during a second timeslot, wherein the second timeslot is one of the one or more available timeslots, and wherein said transferring is performed after said buffering.

12. The NI of claim 11, wherein the one or more functional units are further configured to:
receive second data for storage in the first memory during the second timeslot, wherein the second data are received in a non-deterministic manner;
determine that the second timeslot is one of the one or more available timeslots based on the schedule; and
transfer the second data to the first memory via the bus during the second timeslot.

13. The NI of claim 11, wherein the second data are received from one or more devices coupled to the NI via a non-deterministic network.

14. The NI of claim 12, wherein the first memory is coupled to a first functional unit, wherein the one or more functional units are further configured to:
receive third data for storage in the first memory during the first timeslot, wherein the third data comprise deterministic data;
determine that the first timeslot is one of the one or more reserved timeslots based on the schedule; and
transfer, during the first time slot, the third data to the first memory via the bus;
wherein the first functional unit executes real time logic using the third data, wherein the first functional unit accesses the third data from the first memory; and
wherein the bus is available for transfer of deterministic data during the first timeslot.

15. The NI of claim 11, wherein the NI implements an incomplete stack, comprising a physical layer and a Media Access Control (MAC) layer.

16. The NI of claim 11, wherein the NI is coupled via the bus to a real-time control system, wherein the first memory is a system memory for the real-time control system, wherein the schedule is received from the real-time control system via the bus.

17. The method of claim 16, wherein the real-time control system comprises a motion control system.

18. The method of claim 16, wherein the real-time control system comprises a process control system.

19. The method of claim 16, wherein the real-time control system comprises one or more of:
a brake-by-wire system;
a throttle-by-wire system; or
a steer-by-wire system.

20. The NI of claim 11, wherein the one or more reserved timeslots are of predetermined duration and repeat in a cyclical manner.

* * * * *